(12) United States Patent
Spencer

(10) Patent No.: US 6,295,582 B1
(45) Date of Patent: *Sep. 25, 2001

(54) SYSTEM AND METHOD FOR MANAGING DATA IN AN ASYNCHRONOUS I/O CACHE MEMORY TO MAINTAIN A PREDETERMINED AMOUNT OF STORAGE SPACE THAT IS READILY AVAILABLE

(75) Inventor: Thomas V Spencer, Ft Collins, CO (US)

(73) Assignee: Hewlett Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/232,194
(22) Filed: Jan. 15, 1999
(51) Int. Cl.[7] .............................. G06F 12/12; G06F 13/00
(52) U.S. Cl. ............................... 711/135; 711/133; 710/57
(58) Field of Search .................................. 711/135, 133; 710/52, 57

(56) References Cited

U.S. PATENT DOCUMENTS

| | | | |
|---|---|---|---|
| 5,446,863 | 8/1995 | Stevens et al. | 711/100 |
| 5,608,878 | 3/1997 | Arimilli et al. | 710/107 |
| 5,673,414 | 9/1997 | Amini et al. | 711/146 |
| 5,717,884 | 2/1998 | Gzym et al. | 711/206 |
| 5,724,549 | 3/1998 | Segas et al. | 711/141 |
| 5,751,993 | 5/1998 | Ofek et al. | 711/136 |
| 5,787,471 | 7/1998 | Inoue et al. | 711/133 |
| 5,787,473 | 7/1998 | Vishlitzky et al. | 711/134 |
| 5,809,022 | 9/1998 | Byers et al. | 370/395 |
| 5,892,937 | * 4/1999 | Caccavale | 711/135 |
| 5,893,920 | * 4/1999 | Shaheen et al. | 711/133 |
| 5,895,488 | * 4/1999 | Loechel | 711/135 |
| 5,926,834 | * 7/1999 | Carlson et al. | 711/135 |
| 6,073,215 | * 6/2000 | Snyder | 711/137 |
| 6,078,994 | * 6/2000 | Carey | 711/133 |

* cited by examiner

Primary Examiner—Glenn Gossage

(57) ABSTRACT

A system and method are described for providing improved cache memory management. Broadly, the system and method improve the performance of an asynchronous input/output (I/O) cache by ensuring that a certain predetermined amount of space is readily available, at all times, to receive new data. In this regard, a memory manager monitors the cache memory space, and evaluates how much "free" or available space exists at all times. As new data is read into the cache memory space, the amount of "free" space is reduced. Once the free spaced is reduced below a predetermined amount, then one or more cache lines are flushed or discarded to ensure that the predetermined amount of space remains available at all times. Significantly, the system and method eliminate the latency that is associated with checking a cache to determine whether free space is available and/or freeing up space in a cache for new data.

15 Claims, 5 Drawing Sheets

SYSTEM AND METHOD FOR MANAGING DATA IN AN ASYNCHRONOUS I/O CACHE MEMORY TO MAINTAIN A PREDETERMINED AMOUNT OF STORAGE SPACE THAT IS READILY AVAILABLE

BACKGROUND OF THE INVENTION

1. Field of the Invention

The present invention generally relates to memory management systems, and more particularly to a system for managing data in an asynchronous input/output (I/O) cache memory.

2. Discussion of the Related Art

In computer system design, a principal objective is to continually design faster and more efficient computer systems. In this regard, most conventional high-performance computer systems include cache memories. As is known, a cache memory is a high-speed memory that is positioned between a microprocessor and main memory in a computer system in order to improve system performance. Typically, cache memories (or caches) store copies of portions of main memory data that are actively being used by the central processing unit (CPU) while a program is running. Since the access time of a cache can be faster than that of main memory, the overall access time can be reduced.

Cache memory is used in data storage systems so that under typical conditions, a relatively large and usually slow main memory can be accessed at a relatively high rate. The cache memory is a relatively small high-speed memory that can store, at any given time, a portion of the data stored in the main memory. The cache memory also includes a cache directory or index of the data elements stored therein. The cache directory is referenced to provide an indication of whether or not each data element is located in the cache memory at any given time, and if so, the present location of the data element in the cache memory.

A data storage system is typically responsive to data access requests from a host computer. The data access requests, for example, include read and write requests. When a data storage system having a cache memory receives a request for access to data, the cache directory is inspected to determine whether the data element to be accessed resides in the cache memory. If so, the data storage system accesses the data in the cache memory. If not, the data storage system accesses the data in the main memory, and if the accessed data is likely to be accessed again in the near future, the accessed data is copied into the cache memory.

Although processor caches are perhaps the best known, other caches are known and used as well. For example, I/O caches are known for buffering and caching data between a system bus and an I/O bus. As will be further described below, certain system components, like a microprocessor and memory, are synchronized off a different clock than I/O transactions. When passing data between two differing frequency domains, it is usually desirable, if not necessary, to buffer the data in some way. One way that this is done is by passing the data through an I/O cache.

Because the cache memory has a capacity that is usually much smaller than the main memory, it is often necessary for data elements in the cache memory to be replaced or removed from the cache memory in order to provide space in the cache memory for new receiving data elements to be copied into the cache memory. In general, for the cache memory to be useful, the data elements replaced or removed from the cache memory must be less likely to be accessed in the near future than the data elements that are staged into the cache memory. This process is conventionally known as cache management.

A wide variety of methods and strategies are known for managing data within a cache memory to achieve optimum system performance. These methods often vary from system to system, and from application to application. Management methods may vary depending upon whether the cache memory is an electronic (e.g., integrated circuit) memory that is caching data on a disk drive (main memory), or whether the cache memory is a high speed electronic memory that is caching data for a slower speed electronic memory (main memory). Management methods may further vary depending upon the size of the cache memory.

Notwithstanding the various cache memory management methods, generally, when space is available within the cache memory for new data, the new data is simply copied into the available space, and logged in the directory/index of the cache. When, however, no additional space is available for new data then existing data must be discarded to make room for the new data. Also, the directory/index must be updated accordingly. As previously mentioned, there are a variety of methods that are known and implemented to determine which data within the cache to discard, each of which seeks to discard data that will not likely be used again (at least in the near term).

Notwithstanding the various known methods for cache memory management, further improvements are desired.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for providing improved cache memory management. Broadly, the present invention improves the performance of an asynchronous I/O cache by ensuring that a certain predetermined amount of space is readily available, at all times, to receive new data. In this regard, a memory manager (dedicated hardware within the cache) monitors the cache memory space, and evaluates how much "free" or available space exists at all times. As new data is read into the cache memory space, the amount of "free" space is reduced. Once the free spaced is reduced below a predetermined amount, then one or more cache lines are discarded to ensure that the predetermined amount of space remains available at all times.

In accordance with one aspect of the invention, the invention includes a method for managing data within the cache memory comprising the steps of identifying a request for data from the system memory by a device, wherein the data requested is not presently in a data storage area of the cache memory, and reading the data from the system memory into the data storage area of the cache memory. The method then evaluates the cache memory to determine whether at least a predetermined amount of space within the data storage area is readily available. Then the method flushes a portion of the data within the data storage area, only if at least the predetermined amount of space is not readily available. The foregoing steps are then repeated.

Importantly, the step of reading the data from the system memory into the data storage area occurs immediately after the step of identifying a request for data. In this regard, by virtue of the present invention, it may successfully be assumed that at least a predetermined amount of space is immediately available within the cache memory to receive new data. Therefore, no latency delay is incurred, which is otherwise incurred if the cache memory is full and certain data must be discarded.

In accordance with the preferred embodiment, the predetermined amount of data may be programmably configured. Preferably, the acceptable range for this predetermined amount may vary from one cache line to four cache lines. Further, the step of reading data into the cache memory may further include the step of determining the number of data bytes to be read into the cache memory (if more than one), and immediately reading all the requested data bytes into available cache memory space.

In accordance with another aspect of the present invention, a method is provided for managing data within a cache memory, wherein the method includes the principal steps of determining a quantity of available space within a data storage area, and comparing the quantity of available space with a predetermined value. In addition the method include the step of flushing at least one line of data from the cache memory if the available space is less than the predetermined value. In accordance with one embodiment the step of comparing includes evaluating a flush control register that specifies the predetermined value, In accordance with yet another aspect of the present invention, a system is provided for managing data in a cache memory. The system includes a memory space comprising a plurality of data lines within the cache memory, and a memory manager configured to manage the data within the memory space. The memory manager further includes first means for determining a quantity of available space within a data storage area, second means for comparing the quantity of available space with a predetermined value, and third means for controllably flushing at least one line of data from the cache memory if the available space is less than the predetermined value.

Preferably, the first means includes a circuit configured to evaluate a directory containing addresses of data stored within the data storage area. Similarly, the second means preferably includes a circuit having a flush control register, wherein the flush control register includes a plurality of bits (programmably variable) that specify the predetermined value. Finally, the third means includes a circuit configured to flush at least one line of data from the data storage area, to maintain at least the predetermined value of cache lines available to receive new data at all times.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
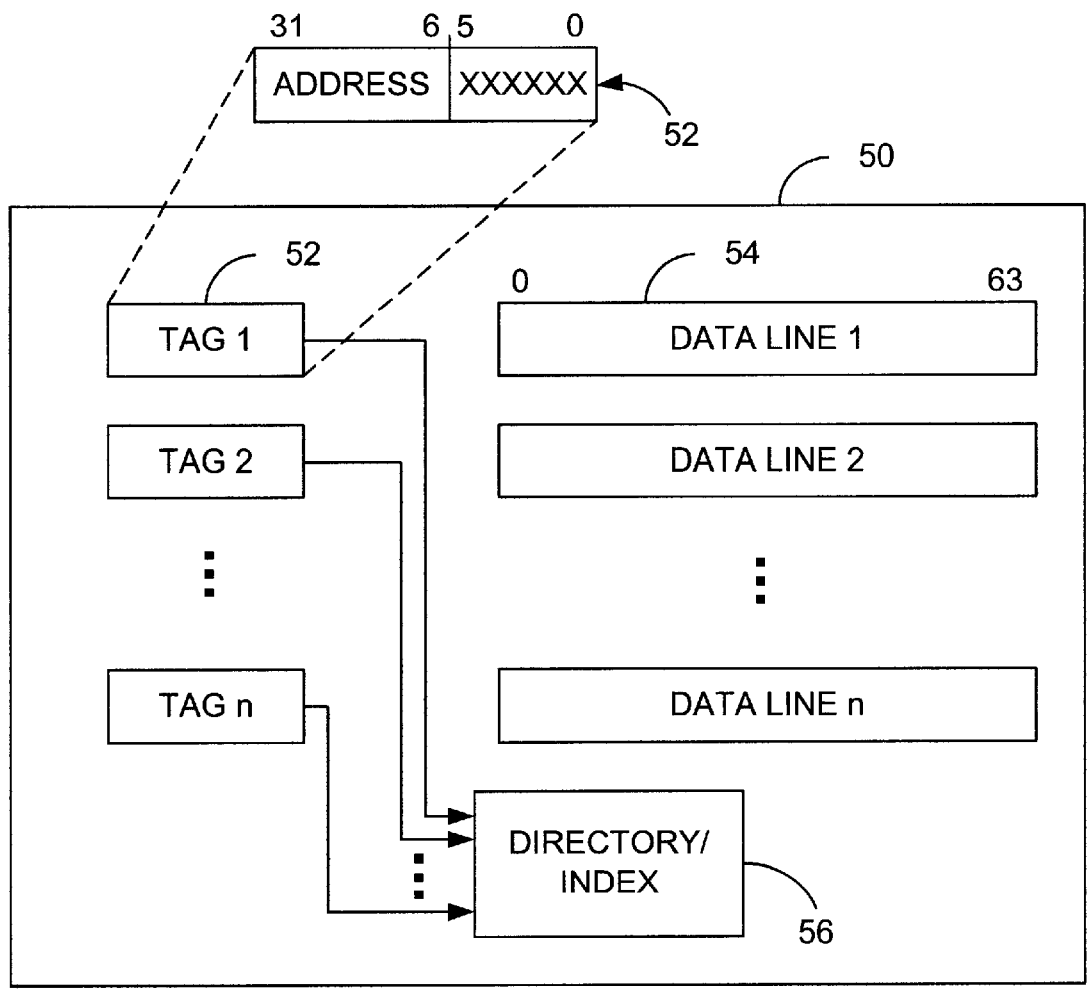
FIG. 1 is a block diagram illustrating fundamental components of a cache memory device.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Cache Basics

Before discussing the novel aspects of the present invention, additional information regarding cache memories will first be presented. As previously mentioned, a cache memory is a high-speed memory that is positioned between a microprocessor and main memory in a computer system in order to improve system performance. Cache memories (or caches) store copies of portions of main memory data that are actively being used by the central processing unit (CPU) while a program is running. Since the access time of a cache can be faster than that of main memory, the overall access time can be reduced.

Many microprocessor-based systems implement a "direct mapped" cache memory. In general, a direct mapped cache memory comprises a high-speed data Random Access Memory (RAM) and a parallel high-speed tag RAM. The RAM address of each line in the data cache is the same as the low-order portion of the main memory line address to which the entry corresponds, the high-order portion of the main memory address being stored in the tag RAM. Thus, if main memory is thought of as $2^m$ blocks of $2^n$ "lines" of one or more bytes each, the $i^{th}$ line in the cache data RAM will be a copy of the $i^{th}$ line of one of the $2^m$ blocks in main memory. The identity of the main memory block that the line came from is stored in the $i^{th}$ location in the tag RAM.

When a CPU requests data from memory, the low-order portion of the line address is supplied as an address to both the cache data and cache tag RAMs. The tag for the selected cache entry is compared with the high-order portion of the CPU's address and, if it matches, then a "cache hit" is indicated and the data from the cache data RAM is enabled onto a data bus of the system. If the tag does not match the high-order portion of the CPU's address, or the tag data is invalid, then a "cache miss" is indicated and the data is fetched from main memory. It is also placed in the cache for potential future use, overwriting the previous entry. Typically, an entire line is read from main memory and placed in the cache on a cache miss, even if only a byte is requested. On a data write from the CPU, either the cache RAM or main memory or both may be updated, it being understood that flags may be necessary to indicate to one that a write has occurred in the other.

Accordingly, in a direct mapped cache, each "line" of secondary memory can be mapped to one and only one line in the cache. In a "fully associative" cache, a particular line of secondary memory may be mapped to any of the lines in the cache; in this case, in a cacheable access, all of the tags must be compared to the address in order to determine whether a cache hit or miss has occurred. "n-way set associative" cache architectures also exist which represent a compromise between direct mapped caches and fully associative caches. In an n-way set associative cache architecture, each line of secondary memory may be mapped to any of n lines in the cache. In this case, k tags must be compared to the address during a cacheable secondary memory access in order to determine whether a cache hit or miss has occurred. Caches may also be "sector buffered" or "sub-block" type caches, in which several cache data lines, each with its own valid bit, correspond to a single cache tag RAM entry.

When the CPU executes instructions that modify the contents of the cache, these modifications must also be made in the main memory or the data in main memory will become "stale." There are two conventional techniques for keeping the contents of the main memory consistent with that of the cache—(1) the write-through method and (2) the write-back or copy-back method. In the write-through method, on a cache write hit, data is written to the main memory immediately after or while data is written into the cache. This enables the contents of the main memory always to be valid and consistent with that of the cache. In the write-back method, on a cache write hit, the system writes data into the cache and sets a "dirty bit" which indicates that a data word has been written into the cache but not into the main memory. A cache controller checks for a dirty bit before overwriting any line of data in the cache, and if set, writes the line of data out to main memory before loading the cache with new data.

A computer system can have more than one level of cache memory for a given address space. For example, in a two-level cache system, the "level one" (L1) cache is logically adjacent to the host processor. The second level (L2) cache is logically behind the first level cache, and DRAM memory (which in this case can be referred to as tertiary memory) is located logically behind the second level cache. When the host processor performs an access to an address in the memory address space, the first level cache responds if possible. If the first level cache cannot respond (for example, because of an L1 cache miss), then the second level cache responds if possible. If the second level cache also cannot respond, then the access is made to DRAM itself. The host processor does not need to know how many levels of caching are present in the system or indeed that any caching exists at all. Similarly, the first level cache does not need to know whether a second level of caching exists prior to the DRAM. Thus, to the host processing unit, the combination of both caches and DRAM is considered merely as a single main memory structure. Similarly, to the L1 cache, the combination of the L2 cache and DRAM is considered simply as a single main memory structure. In fact, a third level of caching could be included between the L2 cache and the actual DRAM, and the L2 cache would still consider the combination of L3 and DRAM as a single main memory structure.

Computer system cache memories typically cache main memory data for the CPU. If the cache uses a write-back protocol, then frequently the cache memory will contain more current data than the corresponding lines in main memory. This poses a problem for other bus masters (and for other CPUs in a multiprocessor system) desiring to access a line of main memory, because it is not known whether the main memory version is the most current version of the data. Write-back cache controllers, therefore, typically support inquire cycles (also known as snoop cycles), in which a bus master asks the cache memory to indicate whether it has a more current copy of the data.

FIG. 1 is a block diagram that illustrates certain fundamental components of a cache memory 50. These fundamental components include a plurality of tags 52, a corresponding plurality of data lines 54, and a directory/index 56. As is known, cache tags 52 typically comprise a portion (the most significant bits) of the address bits that define blocks (lines) of memory location(s) of target data. The least significant bits (represented as don't care values) identify the specific position (within the blocks) to a target data value in the corresponding data line 54. In accordance with the preferred embodiment of the present invention, the cache memory 50 utilizes sixty-four byte data lines 54. Therefore, the six least significant bits of the address bits specify the particular location of a target data value within a given data line 54.

Also illustrated in FIG. 1 is a directory/index 56. As is known, the directory 56 maintains a log or database of the various tags 52. Upon start-up or initialization, there is no data stored within the cache memory 50, and therefore no tags are stored in the directory 56. Therefore, when a device requests data to be read from system memory, an entire line 54 is read from the system memory into a data line 54 of the cache memory 50. The most significant bits of the address bus are written into the corresponding tag 52, which is stored in the directory 56. Upon the next request for data from a specified memory location, the cache memory 50 will examine the directory 56 to determine whether that data value is presently within the cache. If the data value is, in fact, within the cache memory 50, then it may be accessed and read out at high speed. If, however, the data value is not presently stored within the cache memory 50, then it is retrieved from the system memory and read into an available data line 54 of the cache memory 50. As before, the most significant bits of the address bus are written into a corresponding tag, and logged in the directory 56.

The foregoing process is repeated for subsequent requests for data from system memory. At some point, however, all data lines 54 of the cache memory 50 will be occupied. At this point, the cache memory 50 must discard at least one line 54 of data, in order to make space available for new data to be read into the cache 50. As previously mentioned, there are a wide variety of algorithms and methods that are known for determining which line or lines 54 of data to discard from the cache 50. Preferably, an algorithm is chosen that will discard those data lines 54 which are least likely to be used again in the near future. As data is discarded from the cache 50, the directory 56 is updated accordingly to remove the corresponding tag(s) 52 from the directory space.

An efficient cache yields a high "hit rate" which is the percentage of cache hits that occur during all memory accesses. When a cache has a high hit rate, the majority of memory accesses are serviced with zero wait states. The net effect of a high cache hit rate is that the wait states incurred on a relatively infrequent miss are averaged over a large number of zero wait state cache hit accesses, resulting in an average of nearly zero wait states per access. Also, since a cache is usually located on the local bus of the microprocessor, cache hits are serviced locally without requiring use of the system bus. Therefore, a processor operating out of its local cache has a much lower "bus utilization." This reduces system bus bandwidth used by the processor, making more bandwidth available for other devices, such as intelligent bus masters, which can independently gain access to the bus.

Although processor caches are perhaps the best known, other caches are known and used as well. For example, I/O caches are known for buffering and caching data between a system bus and an I/O bus. As will be further described below, certain system components, like a microprocessor and memory, are synchronized off a different clock than I/O transactions. When passing data between two differing frequency domains, it is usually desirable, if not necessary, to buffer the data in some way. One way that this is done is by passing the data through an I/O cache.

Cache management is generally performed by a device referred to as a cache controller. One cache management duty performed by the cache controller is the handling of processor writes to memory. The manner in which write operations are handled determines whether a cache is designated as "write-through" or "write-back." When the processor initiates a write to main memory, the cache is first checked to determine if a copy of the data from this location resides in the cache. If a processor write hit occurs in a write-back cache design, then the cache location is updated with the new data, and main memory is only updated later if this data is requested by another device, such as a bus master. Alternatively, the cache maintains the correct or "clean" copy of data thereafter, and the main memory is only updated when a flush operation occurs. In a write-through cache, the main memory location is generally updated in conjunction with the cache location on a processor write hit. If a processor write miss occurs to a write-through cache, the cache controller may either ignore the write mass or may perform a "write-allocate," whereby the cache controller allocates a new line in the cache in addition to passing the data to the main memory In a write-back cache design, the cache controller generally allocates a new line in the cache when a processor write miss occurs. This generally involves reading the remaining entries from main memory to fill the line in addition to allocating the new write data.

The cache controller includes a directory that holds an associated entry for each set in the cache. In a write-through cache, this entry generally has three components: a tag, a tag valid bit, and a number of line valid bits equaling the number of lines in each cache set. The tag acts as a main memory page number, and it holds the upper address bits of the particular page in main memory from which the copy of data residing in the respective set of the cache originated. The status of the tag valid bit determines whether the data in the respective set of the cache is considered valid or invalid. If the tag valid bit is clear, then the entire set is considered invalid. If the tag valid bit is true, then an individual line within the set is considered valid or invalid depending on the status of its respective line valid bit. In a write-back cache, the entries in the cache directory are generally comprised of a tag and a number of tag state bits for each of the lines in each set. As before, the tag comprises the upper address bits of the particular page in main memory from which the copy originated. The tag state bits determine the status of the data for each respective line, i.e., whether the data is invalid, modified (owned), or clean.

A principal cache management policy is the preservation of cache coherency. Cache coherency refers to the requirement that any copy of data in a cache must be identical to (or actually be) the owner of that location's data. The owner of a location's data is generally defined as the respective location having the most recent or the correct version of data. The owner of data is generally either an unmodified location in main memory, or a modified location in a write-back cache.

In computer systems where independent bus masters can access memory, there is a possibility that a bus master, such as a direct memory access controller, network or disk interface card, or video graphics card, might alter the contents of a main memory location that is duplicated in the cache. When this occurs, the cache is said to hold "stale," "dirty" or invalid data. Also, when the processor executes a cache write hit operation to a write-back cache, the cache receives the new data, but main memory is not updated until a later time, if at all. In this instance, the cache contains a "clean" or correct version of the data and is said to own the location, and main memory holds invalid or "stale" data. Problems would arise if the processor was allowed to access stale data from the cache, or if a bus master was allowed to access dirty data from main memory. Therefore, in order to maintain cache coherency, i.e., in order to prevent a device such as a processor or bus master from inadvertently receiving incorrect or stale data, it is necessary for the cache controller to monitor the system bus for bus master accesses to main memory when the processor does not control the system bus. This method of monitoring the bus is referred to as snooping.

In a write-back cache design, the cache controller must monitor the system bus during memory reads by a bus master because of the possibility that the cache may own the location, i.e., the cache may contain the only correct copy of data for this location, referred to as modified data. This is referred to as read snooping. On a read snoop hit where the cache contains modified data, the cache controller generally provides the respective data to main memory, and the requesting bus master generally reads this data en route from the cache controller to main memory, this operation being referred to as snarfing. Alternatively, the cache controller provides the respective data directly to the bus master and not to main memory. In this alternative scheme, the main memory would perpetually contain erroneous or "stale" data until a cache flush occurred.

In both write-back and write-through cache designs, the cache controller must also monitor the system bus during bus master writes to memory because the bus master may write to or alter a memory location having data that resides in the cache. This is referred to as write snooping. On a write snoop hit to a write-through cache, the cache entry is generally marked invalid in the cache directory by the cache controller, signifying that this entry is no longer correct. In a write-back cache, the cache is updated along with main memory, and the tag states bits are set to indicate that the respective cache location now includes a clean copy of the data. Alternatively, a write-back cache may invalidate the entire line on a snoop write hit. Therefore, in a write-back cache design, the cache controller must snoop both bus master reads and writes to main memory. In a write-through cache design, the cache controller need only snoop bus master writes to main memory.

The process of snooping generally entails that the cache controller latch the system bus address and perform a cache look-up in the tag directory corresponding to the page offset location where the memory access occurred to see if a copy of data from the main memory location being accessed also resides in the cache. If a copy of the data from this location does reside in the cache, then the cache controller takes the appropriate action depending on whether a write-back or write-through cache design has been implemented, or whether a read or write snoop hit has occurred. This prevents incompatible or inconsistent data from being stored in main memory and the cache, thereby preserving cache coherency.

Environment of the Present Invention

Having described certain basic aspects of cache memory devices, the discussion will now be directed to the operating environment of the preferred embodiment of present invention. In this regard, the present invention is directed to a system and method for managing the data within a cache memory. More specifically, the inventive method for managing cache data is particularly useful in an I/O cache, or some other similar environment where data is communicated from one synchronous subsystem (synchronized to a first clock) to another synchronous subsystem (synchronized to a second clock).

Figure 2:
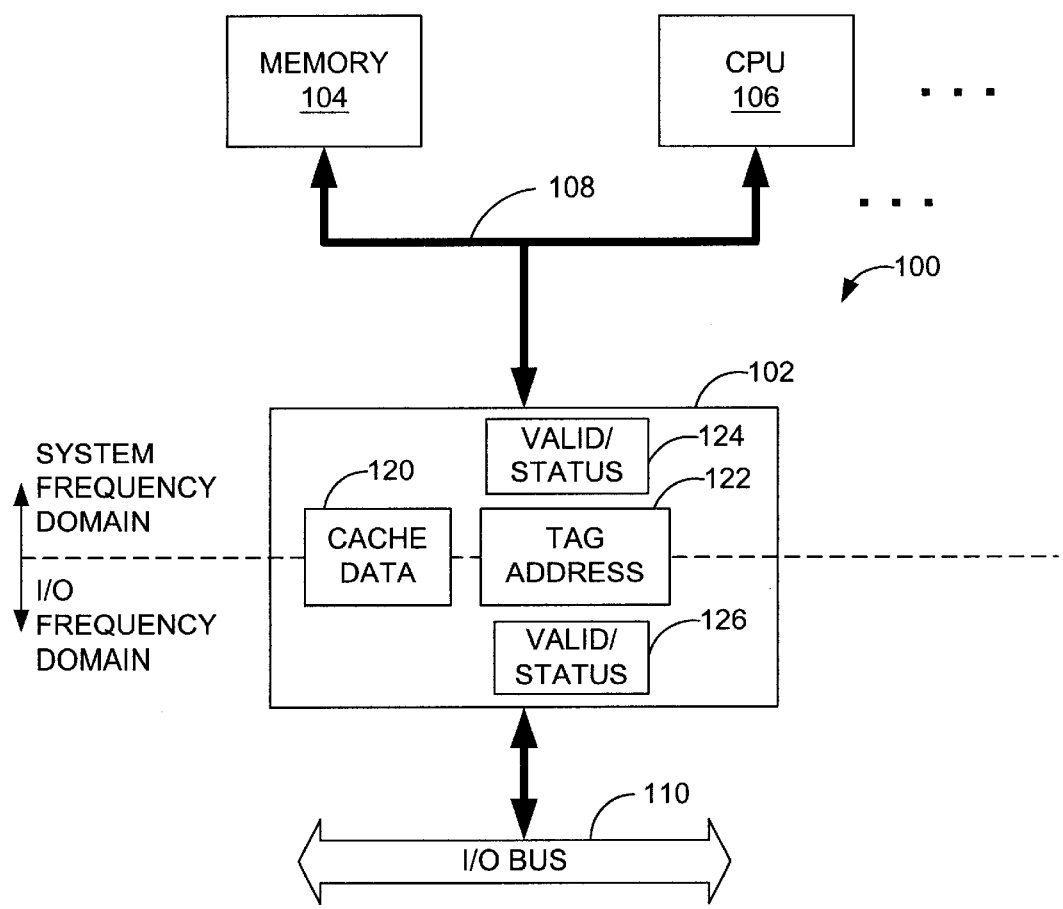
FIG. 2 is a block diagram of an I/O cache system constructed in accordance with a preferred environment of the present invention.

Reference is now made to FIG. 2, which is a block diagram that illustrates a top-level view of a system 100 constructed in accordance with a preferred computing environment for the invention. More particularly, the invention comprises an apparatus 102 that is particularly configured to be interposed between a system bus 108 and an I/O bus 110. As will be appreciated by persons skilled in the art, the system bus 108 is a grouping of conductors that provides a means for intercommunicating among a number of devices in a computing system, such as a memory 104, a CPU 106, as well as other devices. In similar fashion, the I/O bus 110 is a grouping of conductors that provides a means for the devices 104, 106 on the system bus 108 to intercommunicate with other, remote devices I/O.

For example, in a computing environment such as a personal computer, a system is frequently provided having a motherboard that contains certain system components, such as a memory and central processing unit (CPU), on a motherboard. To accommodate a variety of differing "expansion" cards, a plurality of expansion slots are provided on the motherboard as well. Such expansion cards may include disk drive controllers, modems and other communication cards, etc. While some cards or devices such as these may intercommunicate with the CPU and memory via the system bus 108, others often communicate via an I/O bus, such as a peripheral component interface (PCI) bus.

As is known, the devices that intercommunicate via the system bus 108 generally do so in a synchronous fashion, insofar as these devices operate from a common system clock. This is represented graphically in the figure by dashed frequency boundary line 116, whereby devices on the system side of line 116 are said to operate in a system frequency domain, which is the frequency of the system clock. Devices that intercommunicate across the I/O bus also do so in a synchronized fashion, but are synchronized to or with a different clock. Indeed, typically the I/O clock operates at a different frequency than the system clock. Accordingly, devices on this side of the dashed line are said to operate in the I/O frequency domain. In prior art systems, a cache or other buffering device interposed between a system bus and an I/O bus was typically designed to operate in either the system frequency domain or the I/O frequency domain. As a result, certain latency penalties were paid when conducting operations or transactions that crossed the frequency boundary 116.

The preferred embodiment of the present invention operates in a system that overcomes these latency shortcomings by providing a device 102 that effectively straddles the frequency boundary. The present invention operates in a device having a cache data storage area 120 as well as an address (or tag) storage area 122 that straddles the frequency boundary 116. In this regard, it will be appreciated that the frequency boundary 116 is not so much a physical boundary as it is a conceptual boundary. When the cache data storage area 120 and tag/address storage area 122 are characterized to straddle this boundary, it simply means that one set of data and one set of addresses are provided within a device 102, as opposed to duplicative sets of data and addresses. Advantageously, this minimizes the chip space required for accommodating duplicative data and address storage areas. What is duplicated, in connection with the present invention, is certain validity/status circuitry 124 and 126. Specifically, circuitry 124 is provided to indicate when data within the data storage area 120 is valid, from the perspective of the system bus 108. Likewise, circuitry 126 is provided to indicate when data within the data storage area 120 is valid from the perspective of the I/O bus 110. As will be appreciated from the discussion that follows, the system achieves its advantages by essentially hiding the latency that is incurred when crossing the frequency boundary 116. In this regard, the latency penalties are paid at non-critical times.

For example, when a fetch instruction or operation is executed, whereby a device seeks to fetch data from system memory 104 via the I/O bus 110, several cycles of delay are encountered in order to fetch the data across the frequency boundary 116. While this latency frequently is incurred for each successive byte of data that is fetched, the device 102 effectively hides this latency by incurring it (from the prospective of the I/O bus 110) only in connection with the first data byte fetched. Subsequent data bytes may be fetched into the data storage area 120 and then retrieved by the I/O bus 110 with no subsequent latency periods encountered either. Similarly, and as will be further described below, the device 102 operates in a manner that allows the snoopy coherency protocol to occur on the system side (between the system bus 108 and the device 102) without incurring latency delays during the critical periods.

Figure 3:
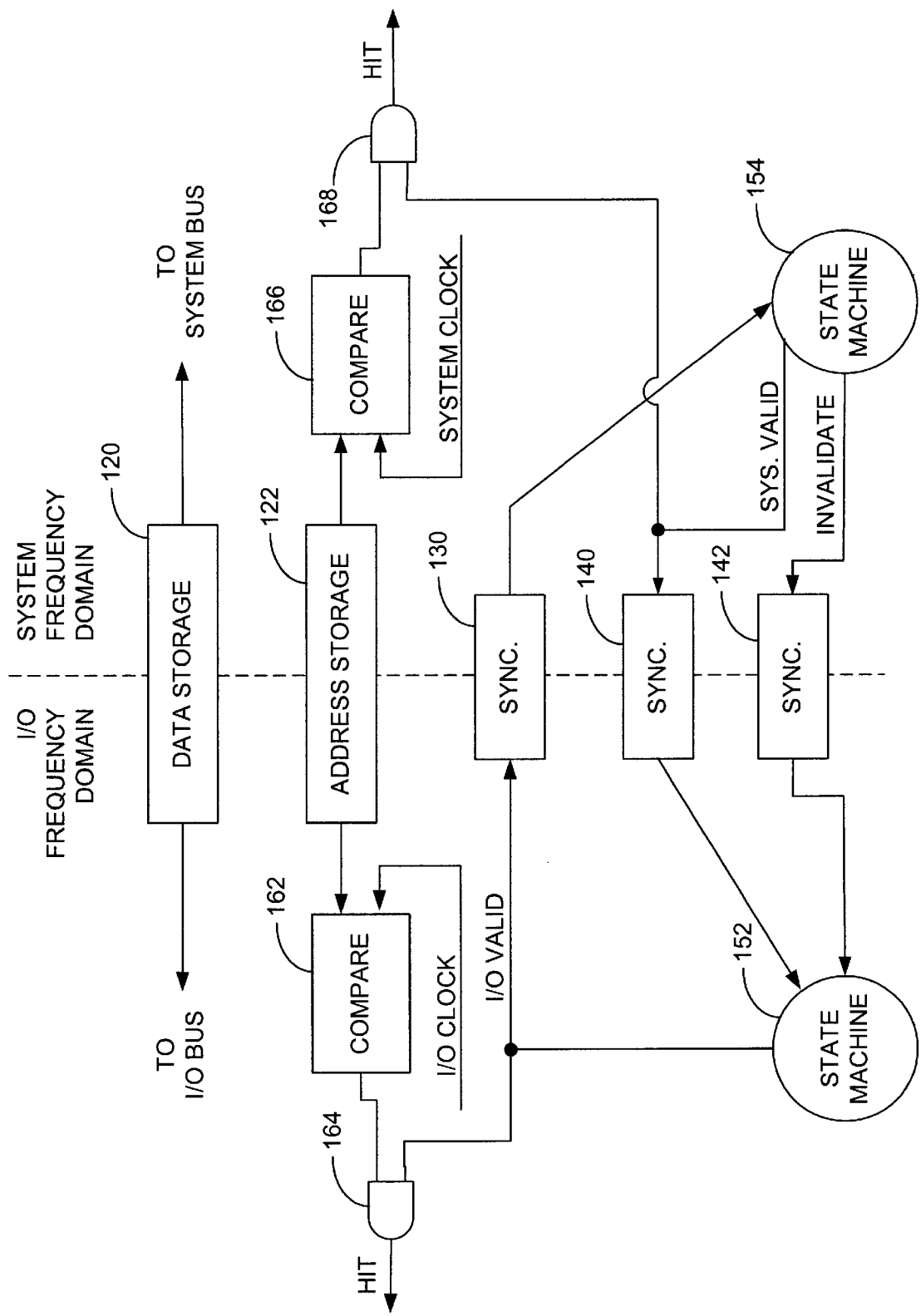
FIG. 3 is a block diagram of a device including an I/O cache, in accordance with a preferred environment of the present invention.

Reference is now made to FIG. 3, which is a block diagram that more specifically illustrates the device 102. As previously mentioned, the device 102 includes a data storage area 120 and an address storage area 122 that, conceptually, straddle the frequency boundary 116 between the system frequency domain and the I/O frequency domain. In accordance with the inventive concepts, synchronization circuits 130 and 140 are provided that also, conceptually, straddle the frequency boundary 116.

Figure 4:
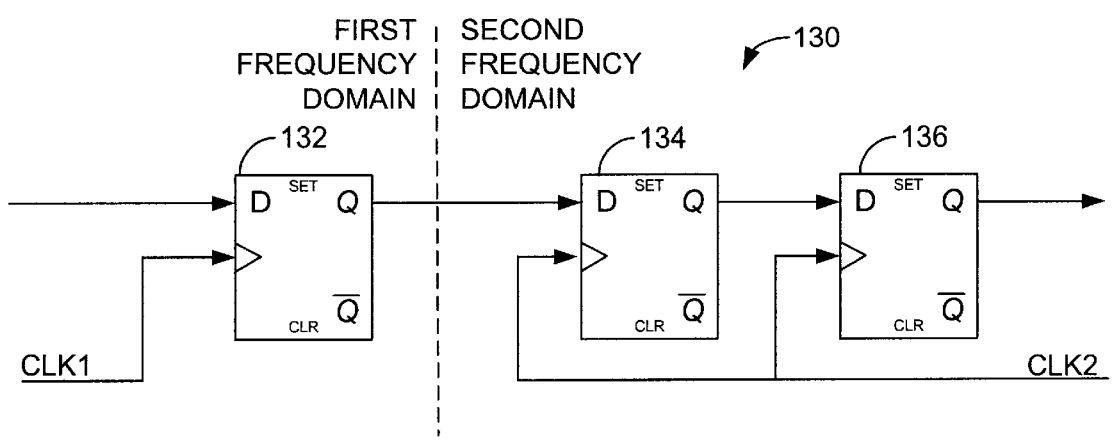
FIG. 4 is a schematic diagram of a synchronization circuit illustrated in FIG. 3.

In this regard, reference is made to FIG. 4 which is a schematic diagram illustrating that circuitry that may preferably comprise the synchronization circuit 130. Specifically, the synchronization block 130 preferably includes three flip-flops 132, 134, and 136, configured as illustrated. A signal that is passed from the I/O frequency domain (more generically denoted as the first frequency domain is clocked using a first clock (CLK1) into a D-type flip-flop 132. The output of this flip-flop is then directed to flip-flop 134, which is clocked by a second clock (CLK2), that is operating in the system frequency domain (or more generically denoted as the second frequency domain). A third flip-flop 136 is provided, whereby the output of flip-flop 134 is directed to the input of flip-flop 136. The purpose of flip-flop 136 is to overcome the potential effects of metastability of flip-flop 134. Specifically, if a signal clocked out of flip-flop 132 is clocked into flip-flop 134, without satisfying either the set up or hold requirements for flip-flop 134, then the output of flip-flop 134 may be metastable (i.e., neither a logic high nor a logic low). As is known, this metastability will typically resolve itself within the period of a clock cycle. Accordingly, coincident with the next clock cycle of CLK2, the output of flip-flop 134 will be settled at either a logic high or logic low, thereby providing a valid output at the output of flip-flop 136.

Returning to FIG. 3, similar synchronization circuits 140 and 142 are provided for signals passing the opposite direction from that of the synchronization circuit 130. As will be further described below, state machines 152 and 154 are provided to control the communication and synchronization of signals across the frequency boundary.

For purposes of illustration and simplification, only one set of signals has been illustrated in FIG. 3 for each of the frequency domains. However, it will be appreciated that, in the preferred embodiment, there will be duplicative circuitry and signals set for each line of data in the data storage area 120. A device 102 constructed in accordance with the preferred embodiment, includes sixteen lines of cache data within the data storage area 120, each line containing sixty-four bytes of data. Accordingly, the validity/status circuitry partially illustrated herein will be replicated sixteen times.

As should be appreciated by persons of ordinary skill in the art, data within the data storage area 120 should never appear valid from the I/O side of the device 102 and not from the system side of the device 102. As will be appreciated from the diagram of FIG. 3, this status is insured by the configuration of the Invalidate, I/O Valid, and Sys. Valid signal lines. Broadly, when driving signals across the frequency boundary, the precise length of time that a signal should be asserted is uncertain. Therefore, it is preferred to provide some sort of feedback with the signaling. This is effectively achieved through the use of the Invalidate, I/O Valid, and Sys. Valid signal lines.

More specifically, state machine 154 generates both Sys. Valid and Invalidate signal lines, which initiate the indication that data is either valid or invalid from the system frequency domain. Both of these signals are passed through synchronization circuits 140 and 142, respectively, and input to state machine 152. State machine 152 generates an I/O Valid signal, which is directed to AND gate 164, as well as being passed back to the system frequency domain via synchronization circuit 130.

By way of illustration, if, through a cache coherency check, it is determined that data within the data storage area is no longer valid (e.g., new data values written into system memory), then state machine 154 asserts the Invalidate signal line. This signal passes through synchronization circuit 142 and is input to state machine 152. In response, state machine 152 negates the I/O Valid signal line, immediately signaling in the I/O frequency domain that the data is not valid. The I/O Valid signal is also directed to state machine 154, via synchronization circuit 130. Therefore, after a few clock cycle delay, the negated I/O Valid signal is input to state machine 154, which negates the Sys. Valid signal line in response. In addition, the Invalidate signal line may be de-asserted. The Sys. Valid signal is directed to AND gate 168, to indicate in the system frequency domain that the data is no longer valid. The Sys. Valid signal is also directed to state machine 152 via synchronization circuit 140. Thus, through this signaling it is observed that the validity status of data within the data storage area 120 is first indicated as invalid on the I/O side, before it is indicated as invalid on the system side.

Likewise, when data is retrieved from system memory into the data storage area 120, then state machine 154 may assert the Sys. Valid signal line. This signal is delivered to state machine 152, which asserts the I/O Valid signal line. Conversely, if data within the data storage area is to be marked as invalid from the I/O frequency domain side, then state machine 152 simply negates the I/O Valid signal (even without being first prompted by the Invalidate signal line). This immediately signals (via AND gate 164) in the I/O frequency domain that data in the data storage area 120 is not valid. Then, several cycles later, data will be indicated as invalid (via AND gate 168) in the system frequency domain.

Thus, state machines 152 and 154 are provided, which generate and control the status of the Invalidate, Sys. Valid, and I/O Valid signal lines. For example the first state machine 154 may be configured to generate an Invalidate signal in response to coherency transactions on the system data bus. The second state machine 152 may be configured to generate an I/O Valid signal in response to a completed fetch operation, whereby data is fetched from system memory into the data storage area. The specific circuitry used to implement the state machines 152 and 154 is not deemed to form part of the present invention, and therefore is not illustrated herein. Indeed, this circuitry may be implemented in a variety of different ways depending upon the particular application of device 102 and the particular implementation chosen for the device 102. Notwithstanding, persons of ordinary skill in the art should appreciate a number of ways to implement the state machines 152 and 154, and therefore a detailed discussion of the same is not necessary herein.

In addition, comparison circuitry 162, 164, 166, and 168 are provided to indicate whether particular data (as identified by an address) is presently within the data storage area 120. This circuitry may be implemented in a conventional manner, wherein comparison logic 162 is provided to determine whether a given address is presently within the address storage area 122. If so, the output of the comparator 162 is effectively "ANDed" with the validity status as reflected by the I/O Valid signal line. That is, in order to generate a "hit" for an I/O request, the address of the specified data must not only be present within the address storage area 122 (as determined by comparator 162), but that data must also be valid (as determined by state machines 152 and 154). Similarly, a request for data from the system side of the device 102 will result in a "hit" only if the address is present within the address storage area 122 (as determined by comparator 166) and the data status is valid (as determined by the state machines 152 and 154).

As will be appreciated, data requested from the I/O data bus typically will be fetched from system memory 104 into the data storage area 120. As previously mentioned, in the preferred embodiment, the I/O data bus 110 is a PCI bus. As is known, there is a mechanism provided in connection with PCI communications, whereby if data requested from system memory is not available within the cache of device 102, then the requesting circuitry will re-request the data several cycles later. Accordingly, if data requested from the PCI bus is not presently within the cache of the device 102, a hit (as reflected by gate 164) will not be generated. The system of the present invention will then request the data from system memory 104 and retrieve it into the data storage area 120. Then, a subsequent read from the PCI bus for that data will, in fact, generate a hit and data can be immediately read from the data storage area 120 to the PCI bus, without incurring latency. Consistent with the invention, data may be prefetched from the system memory 104 such that the latency associated with a fetch or request for data from the PCI bus is encountered only in connection with the initial fetch, and data from subsequent fetches may be immediately retrieved from the data storage area 120.

In the same way, as devices that are disposed in communication with the system bus 108 initiate requests for data from system memory 104, or write data to locations within a system memory 104, the device 102 of the present invention must ensure coherency of data between the system memory 104 and the data storage area 120. In a manner that is known, this coherency may be maintained through a snoopy cache coherency process. It will be appreciated from the foregoing discussion, that when a system address is presented to comparator 166 to determine whether data is presently located within the data storage area 120 (as specified by an address within the address storage area 122), the validity circuitry, including state machines 152 and 154, provide an immediate indication as to whether the data within the data storage area 120 is valid, without incurring the latency delays otherwise associated with crossing the frequency boundary 116. It will be appreciated that this advantageously provides for fast miss detection (i.e., data not in storage area 120) of data. However, if data is detected, then more information will need to be obtained and latency will be incurred. Since the present invention is employed in an I/O cache, however, the vast majority of the time, requested data will not be present in the cache, thereby obtaining the benefits of the quick miss detection the vast majority of the time.

Having described certain basic aspects of both cache memory devices, the discussion will now be directed to the preferred embodiment of the present invention. In this regard, the present invention is directed to a system and method for managing the data within a cache memory, whereby data that is not expected to be used again in the near future is immediately discarded from the cache.

System and Operation of the Present Invention

Figure 5:
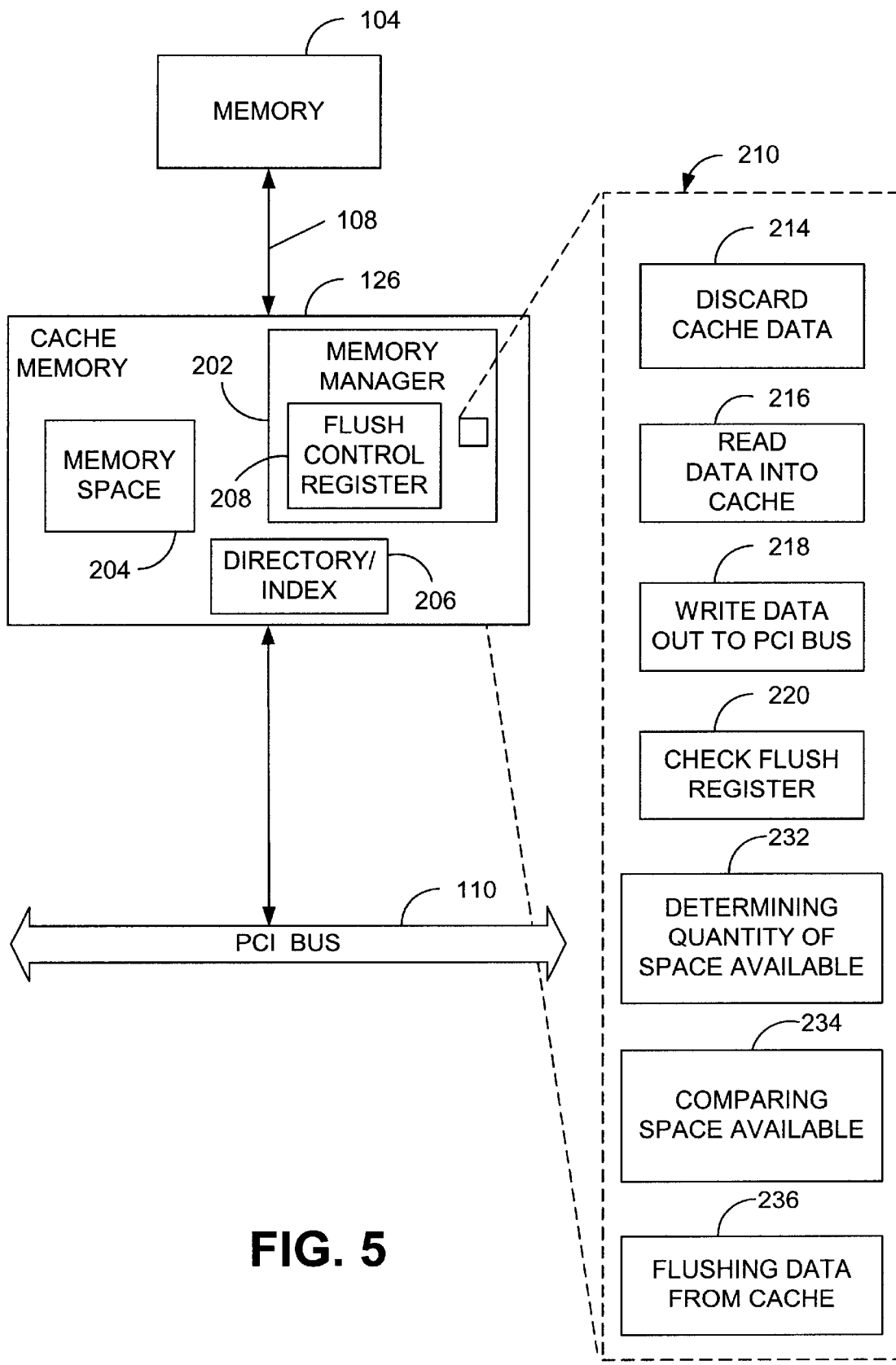
FIG. 5 is a block diagram illustrating a cache memory/memory manager constructed in accordance with the present invention.

Having described the operating environment of the preferred embodiment of the present invention, reference is now made to FIG. 5, which is a block diagram illustrating certain fundamental components of a cache memory 126, constructed in accordance with the present invention. Principally, the cache memory 126 includes a memory manager 202, memory space 204, and a directory/index 206. The memory space 204 corresponds to the data lines discussed in connection with FIG. 1. The memory manager 202 is preferably implemented in hardware, comprising integrated circuits specifically configured to carry out various functions. In one respect, a portion of the memory manager 202 may be viewed as comprising a plurality of functional units 210, each made up from dedicated hardware. For example, and as will be further discussed below in connection with FIG. 6, these functions may include discarding cache data to make space available 214, reading data into the cache 216, writing data out to the PCI bus 218, and evaluating or checking the flush control register 220. The specific implementation of the functions listed above may be made in different ways, consistent with the concepts and teachings of the present invention.

As illustrated, the memory manager may further include additional elements, such as a mechanism 232 for determining a quantity of available space within a data storage area, a mechanism 234 for comparing the quantity of available space with a predetermined value, and a mechanism 236 for controllably flushing at least one line of data from the data storage area of the cache memory if the available space is less than the predetermined value.

Figure 6:
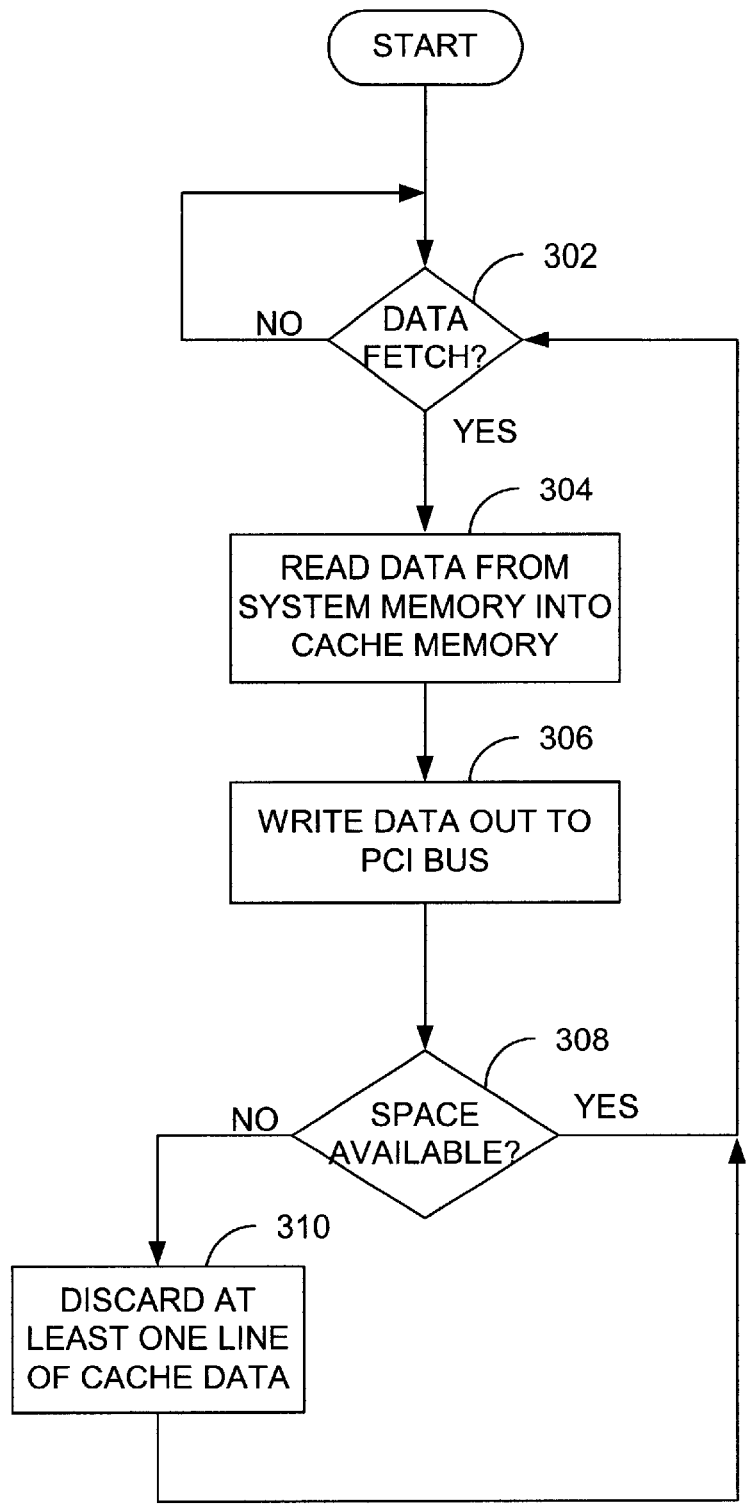
FIG. 6 is a flowchart illustrating the top-level functional operation of a system constructed in accordance with the present invention.

In accordance with one aspect of present invention, and referring to FIG. 6, a method is provided for improving the performance of a cache memory manager 202 of cache memory 126. In accordance with the broad aspect of the invention, the memory manager simply ensures that a certain, predetermined amount of memory space remains available at all times. To achieve this, the memory manager 202 continuously monitors the memory space of the cache. If the memory space that is immediately available to receive new data (i.e., cache lines presently containing no data) falls below a certain predetermined amount, then the memory manager operates to flush one or more lines of cache data.

In a system embodying the present invention, it is determined whether new data is delivered to the cache upon, for example, a data fetch (step 302). Once a request is detected, the memory manager 202 then immediately reads the data from system memory into the memory space of the cache memory (step 304). In accordance with the invention, no undue latency delay need be incurred here, since the memory manager 202 may assume that memory space within the cache memory is immediately available for storage.

Thereafter, the memory manager 202 controls the placement of data read from the system memory 104 into the memory space 204 of the cache memory 126. This step implicitly may include updating the directory 206 with the tag(s) for the data line(s) read into the cache memory 126. Then, the memory manager 202 controls the communication and data out of the cache 126 to the PCI bus 110 (step 306).

In accordance with the preferred embodiment of the present invention, the memory manager 202 ensures that a predefined or predetermined amount of space is maintained as "available" for new cache data (step 308). As will be described below, this "available" space may be programmably defined using a flush control register 208. If at least the predetermined amount of data is determined to be available, then the system may return to step 302, and await the next data fetch. If, however, less than the predefined amount of space (e.g., cache lines) is available, then at least one line is discarded (or additional lines, if necessary to clear the predefined amount of space) (step 310).

In accordance with the preferred embodiment of the present invention, the memory manager 202 utilizes a flush. Control register 208, which provides a mechanism that allows the amount of available space to be programmably varied. Specifically, and as previously described, memory fetches from an I/O bus across the frequency boundary 116 necessarily incur several latency cycles. This latency delay is minimized by placement of the device across (conceptually) the frequency boundary 116, incurring only the initial latency associated with synchronizing signal transfers across the frequency boundary 116. The present invention further minimizes any delays by insuring that there is always space available within the cache memory to receive new data. Although there is some latency even associated with retrieving data into clean cache lines, the invention reduces latency delays that may occur when the cache memory is full, and data must first be discarded before new data may be fetched into the cache memory.

In accordance with the preferred embodiment of the invention the flush control register has the form illustrated in TABLE 1, below:

TABLE 1

| MSB | | | | | | | | | | | | | | | LSB |
|---|---|---|---|---|---|---|---|---|---|---|---|---|---|---|---|
| 63 | 62 | 61 | 60 | 59 | 58 | 57 | 56 | 55 | 54 | 53 | 52 | 51 | 50 | 49 | 48 |
| RESERVED<br>RESELT INITIALIZATION<br>0000 (Hex) | | | | | | | | | | | | | | | |
| 47 | 46 | 45 | 44 | 43 | 42 | 41 | 40 | 39 | 38 | 37 | 36 | 35 | 34 | 33 | 32 |
| LINE ENABLE<br>RESET INITIALIZATION<br>0xFFFF (Hex) | | | | | | | | | | | | | | | |
| 31 | 30 | 29 | 28 | 27 | 26 | 25 | 24 | 23 | 22 | 21 | 20 | 19 | 18 | 17 | 16 |
| RESERVED<br>RESET INITIALIZATION<br>0000 (Hex) | | | | | | | | | | | | | | | |
| 15 | 14 | 13 | 12 | 11 | 10 | 9 | 8 | 7 | 6 | 5 | 4 | 3 | 2 | 1 | 0 |
| | RESERVED | | | | (See TABLE 2) | | | | | RESERVED | | | | Flush Level | |
| RESET INITIALIZATION | | | | | | | | | | | | | | | |
| | 0 (Hex) | | | 1 | 0 | 1 | 1 | | | 0 | | | | 1 | 1 |

Specifically, the preferred flush control register is a sixty-four bit register. The sixteen most significant bits (bits 63–48) are reserved (presently unused), and default to a value of 0000 (Hex) upon reset initialization. The following sixteen bits (bits 47–32) comprise a line enable, and default to 0xFFFF (Hex) upon reset initialization. The line enable function provides added fault tolerance and test scenarios. The following twenty bits (31–12) are reserved and default to 00000 (Hex) upon reset initialization. Likewise bits 2–7 are reserved and default to 0 upon initialization. Bits 0–1 and 8–11 are defined as set forth in TABLE 2, immediately below.

TABLE 2

| Function | Bits | Reset Value | Description |
|---|---|---|---|
| WPF_EMPTY | 11 | 1 | This bit indicates that the write-posting FIFO is empty. This bit is set before DMA can be considered inactive. |
| FLUSH_CACHE | 10 | 0 | Writing 1 to this bit sends a flush signal to all cache lines. Writing a 0 has no effect. Reads of this bit indicate the flush status of the cache. A 1 indicates that flushes are still pending |
| AUTO_W_FLUSH | 9 | 1 | Enables the cache to flush a line when the last byte of the line is written. |
| AUTO_RD_FLUSH | 8 | 1 | Enables the cache to flush a line when the last word of the line is read. |
| FLUSH_LEVEL | 0–1 | 11 | Sets the number of cache lines the Memory Manager attempts to keep empty to FLUSH_LEVEL + 1. |

Specifically, bit 11 (denoted as WPF_EMPTY) indicates whether a write-posting FIFO is empty. This bit must be observed as "Set" before direct memory accesses (DMAs) are considered inactive. Bit 10 (denoted as FLUSH_CACHE) indicates whether cache line flushes are pending. In this regard, bit 10 is set (writing a 1 to this bit position) to send a flush signal to all cache lines. Circuitry automatically clears bit 10, when the flush is complete. Therefore, bit 10 may be monitored to determine when a flush is complete. Therefore, reading the bit position will indicate the status of the flush operation, whereby a one indicates that the flush operation is not completed. Bits 8 and 9 (denoted as AUTO_RD_FLUSH and AUTO_W_FLUSH, respectively) enable the cache to flush a line when the last byte of the line is read or written, respectively. Thus, for certain types of data it may be desirable to immediately discard (or flush) the data as soon as it is read or written.

Finally, and in accordance with the invention, bits 0 and 1 (denoted as FLUSH_LEVEL) are bits that define the amount of space (in terms of cache lines) that the memory manager 202 is to maintain as "available" at all times. In accordance with the preferred embodiment, the number of cache lines that are maintained as "available" is actually one more than the binary number specified by the two bit values of the flush control register 208. Therefore, the device 102 of the preferred embodiment is programmably controllable to vary the number of available cache lines between one and four. Alternatively, the two bit positions may be configured to specify from zero to three available cache lines.

Of course, consistent with the concepts and teachings of the present invention, additional bit positions within the flush control register may be defined to control the number of available lines. For example, in an alternative embodiment, the flush control register may define four bit positions that specify the available space within the cache memory. In such an embodiment, sixteen different levels of availability may be specified. In one such embodiment, the four bit positions may specify from one to sixteen cache lines as "available". In yet another embodiment, the four bit positions may specify from zero to fifteen cache lines as "available."

Having described preferred embodiments of the present invention above, it will be appreciated by those skilled in the art that the broad concepts of the present invention are applicable to other systems as well. In this regard, the broad objective of the present invention is to enhance system performance by discarding at least one line of data when the capacity of the cache memory space exceeds a predetermined threshold. Stated another way, the cache memory of the present invention is designed to maintain a certain, predefined (but programmably variable) amount of space that remains constantly available to receive new data. As new data is read into this space, leaving less than the minimum amount of space, then at least one (or more) line of cache data is discarded, freeing up additional space. This leaves a certain amount of space within the cache readily available to receive new data, without having to first discard other data maintained within the cache memory, The method or algorithm used to discard cache data, in order to make space available, may vary consistent with the invention. In this regard, the invention may employ a least recently used (LRU) algorithm, or some other algorithm for freeing up space.

One advantage of a device constructed in accordance with the invention is that it reduces latency delays associated with the flushing of data from cache memory, when new data is sought to be read into the cache, but no space is available. The tradeoff, however, to realize this advantage is that the invention effectively reduces the size of the cache.

The cache of the preferred embodiment is a sixteen line cache, wherein each line includes sixty-four bytes of data.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. In a computing system having a cache memory interposed between a system memory and an I/O bus, a method for managing data within the cache memory comprising the steps of:
    (a) providing a single data storage area in the cache memory in communication with both a system data bus and an I/O data bus;
    (b) providing a single address storage area configured to store system memory addresses corresponding to data contemporaneously stored in the data storage area;
    (c) identifying a request for data from the system memory by the device, wherein the data requested is not presently in the single data storage area of the cache memory;
    (d) reading the data from the system memory into the single data storage area of the cache memory;
    (e) evaluating the cache memory to determine whether at least a predetermined amount of space within the single data storage area is readily available;
    (f) flushing a portion of the data within the single data storage area, in response to step (c), if at least the predetermined amount of space is not readily available; and
    (g) repeating steps (c) through (f).

2. The method as defined in claim 1, wherein the data storage area comprises sixteen lines, each having sixty four bytes of data.

3. The method as defined in claim 1, wherein step (b) includes immediately reading data from memory into an available line of the data storage area.

4. The method as defined in claim 1, wherein step (b) includes determining the amount of data to be read from the system memory into the cache memory and reading the appropriate number of cache lines of data into the cache memory.

5. The method as defined in claim 1, wherein the predetermined amount of space is programmably configurable.

6. The method as defined in claim 5, wherein the predetermined amount of space is programmably configurable so that from one to four lines of storage area remain readily available at all times.

7. In a computing system having a cache memory interposed between a system memory and a PCI bus, wherein data read from the system memory to the PCI bus is read through the cache memory, a method for managing data within the cache memory comprising the steps of:
    (a) providing a single data storage area in the cache memory in communication with both a system data bus and an I/O data bus;
    (b) providing a single address storage area configured to store system memory addresses corresponding to data contemporaneously stored in the data storage area;
    (c) determining a quantity of available space within the data storage area;
    (d) comparing the quantity of available space with a predetermined value; and
    (e) flushing at least one line of data from the cache memory if the quantity of available space is less than the predetermined value.

8. The method as defined in claim 7, wherein the step of comparing includes evaluating a flush control register that specifies the predetermined value.

9. The method as defined in claim 8, wherein the value specified by the flush control register is programmably variable.

10. A system for managing data in an asynchronous I/O cache memory comprising:
    a single address storage area configured to store system addresses corresponding to data contemporaneously stored in the data storage area;
    memory space comprising a plurality of data lines within the cache memory, the memory space comprising a data storage area in communication with both a system data bus and an I/O data bus, wherein the data storage area is configured to store a non-duplicative data set;
    a single address storage area configured to store system addresses corresponding to data contemporaneously stored in the data storage area;
    a memory manager within the cache memory configured to manage the data within the memory space, the memory manager further including:
        first means for determining a quantity of available space within a data storage area;
        second means for comparing the quantity of available space with a predetermined value; and
        third means for controllably flushing at least one line of data from the data storage area of the cache memory if the available space is less than the predetermined value.

11. The system as defined in claim 10, wherein the first means evaluates a directory containing addresses of data stored within the data storage area.

12. The system as defined in claim 10, wherein the second means includes a flush control register.

13. The system as defined in claim 12, wherein the flush control register includes a plurality of bits that specify the predetermined value.

14. The system as defined in claim 13, wherein the plurality of bits are programmably variable.

15. The system as defined in claim 13, wherein the third means flushes at least one line of data from the data storage area, to maintain at least the predetermined value of cache lines available to receive new data at all times.

* * * * *

UNITED STATES PATENT AND TRADEMARK OFFICE
CERTIFICATE OF CORRECTION

PATENT NO.    : 6,295,582 B1
DATED         : September 25, 2001
INVENTOR(S)   : Spencer It is certified that error appears in the above-identified patent and that said Letters Patent is hereby corrected as shown below:

<u>Title page,</u>
Item [57], ABSTRACT,
Line 3, delete "input/"
Line 4, delete "output (I/O)" and insert therefor -- I/O --
Line 10, delete "free spaced" and insert therefor -- free space --
Line 11, after "lines are" delete "flushed or"

Signed and Sealed this

Eighteenth Day of November, 2003

JAMES E. ROGAN
*Director of the United States Patent and Trademark Office*